United States Patent [19]

Ono

[11] Patent Number: 4,496,116
[45] Date of Patent: Jan. 29, 1985

[54] AUTOMATIC LOCKING RETRACTOR

[75] Inventor: Katsuyasu Ono, Fujisawa, Japan
[73] Assignee: Nsk-Warner K. K., Japan
[21] Appl. No.: 525,308
[22] Filed: Aug. 22, 1983

[30] Foreign Application Priority Data

Aug. 31, 1982 [JP] Japan .............................. 57-132200[U]

[51] Int. Cl.³ ........................ A62B 35/00; B65H 75/48
[52] U.S. Cl. ............................................. 242/107.4 D
[58] Field of Search .................. 242/107.4 R, 107.4 E;
280/806, 807, 808; 297/474–480

[56] References Cited

U.S. PATENT DOCUMENTS

3,659,801  5/1972  Romanzi ...................... 242/107.4 D
4,280,584  7/1981  Makishima .................... 242/107.4 A Primary Examiner—John M. Jillions
Attorney, Agent, or Firm—Cantor and Lessler

[57] ABSTRACT

Disclosed herein is an automatic locking retractor suitable for use in a vehicle seat belt. The retractor does not produce any substantial unpleasant noise when the webbing is wound up, because the cog wheels and lock lever are kept separated while the webbing is wound up on the take-up spindle. The webbing is restrained from being pulled out when the once-pulled out webbing is slightly rewound and is then tried to pull it out again. The retractor features use of a disk, pawl and sensing means.

6 Claims, 7 Drawing Figures

AUTOMATIC LOCKING RETRACTOR

BACKGROUND OF THE INVENTION (1) Field of the Invention

This invention relates to an automatic locking retractor suitable for use in a vehicle seat belt system and producing little unpleasant noise when winding the webbing into the retractor.

(2) Description of the Prior Art

In a vehicle seat belt equipped with a so-called automatic locking retractor, the webbing wound up on the retractor is pulled out and worn by the occupant. The webbing is then allowed to be rewound on the retractor over any extra length thereof. When the occupant tries to pull out the webbing again, the webbing is restrained from any further release. A variety of different types of such automatic locking retractors has been proposed and actually used to date (see, for example, U.S. Pat. No. 3,412,952 issued Nov. 26, 1968 to Wohlert et al, U.S. Pat. No. 3,667,698 issued June 6, 1972 to Fisher, etc.).

Many of such prior art automatic locking retractors are of such a type that they are each constructed of a pair of cog wheels integral with a take-up spindle, on which a webbing is releasably wound up, and a lock lever normally urged or biased in a direction capable of engaging with the cog wheels and controlled by a cam plate.

An automatic locking retractor of the above type is however accompanied by an inconvenience that an unpleasant noise is produced due to contact between the cog wheels and lock lever particularly when winding the webbing into the retractor, because the lock lever is normally urged in the direction capable of engaging with the cog wheels. Since these cog wheels and lock lever have to be made of a metal as forces are exerted thereto, it is considerably difficult to lower the contacting noise between these metal parts.

It may be contemplated to apply a resin coating onto the surface of the lock lever as a method for solving the above problem. It is however necessary to make the resin coating significantly thick. This however leads to a danger that a thick resin coating may induce a slippage of the lock lever from the cog wheels and vice versa when the resin-coated lock lever is brought into engagement with the cog wheels.

As an alternative method, it may also be contemplated to hold the lock lever in a non-engagement position with the cog wheels by means of a cam plate when winding the webbing. This method is however accompanied by such a potential danger that the lock lever may be kept in the non-engagement position or its engagement with the cog wheels may be delayed, thereby failing to achieve sure restraint of any further release of the webbing.

SUMMARY OF THE INVENTION

With the foregoing problems in view, it is an object of this invention to provide an automatic locking retractor which does not produce any substantial unpleasant noise by holding metal parts out of contact and restrains the webbing from being pulled out without failure when the once-pulled out webbing is slightly rewound and is thereafter pulled out again.

In one aspect of this invention, there is thus provided an automatic locking retractor comprising a casing, a take-up spindle rotatably supported on the casing and urged in the winding direction of a webbing, a cog wheel mounted integrally on the take-up spindle, a ratchet wheel rotatable together with the cog wheel, a disk rotatable in association with rotation of the take-up spindle by virtue of a friction force, turnable over a predetermined angle and defining first and second projections on the outer circumference thereof, a lock lever displaceable between a first position where the lock lever is in engagement with the cog wheel and a second position where the lock lever permits free rotation of the cog wheel, a pawl displaceable between an engagement position where the pawl is in engagement with the ratchet wheel, an intermediate position where the pawl is engageable with the ratchet wheel and a non-engagement position where the pawl is kept out of engagement with the ratchet wheel, and sensor means coupled with the pawl and adapted to hold the pawl in the non-engagement position when the webbing has been wound up over a predetermined length or longer, in which the pawl assumes the non-engagement position and is kept in contact with the first projection of the disk when the webbing, which has been wound up on the take-up spindle, is pulled out, assumes the intermediate position and is kept in contact with the second projection of the disk when the webbing has then been rewound over a predetermined small length, and is then guided to the engagement position when the webbing is again pulled out; and the lock lever is displaced from the second position to the first position as the pawl is displaced from the intermediate position to the engagement position.

The automatic locking retractor according to this invention does not produce any substantial unpleasant noise, because the lock lever and cog wheel are so constructed that they are kept out of any direct contact when winding the webbing in the retractor. It also has another excellent advantage that the lock lever is brought into engagement and kept in engagement with the cog wheel without failure and the webbing is restrained from any further release because the lock lever is brought into engagement with the cog wheel, utilizing the motion of the pawl that assumes a position engageable with the ratchet wheel when the once-pulled out webbing is slightly rewound and moves to the engagement position when it is then tried to pull out the webbing again.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENTS

Figure 1:
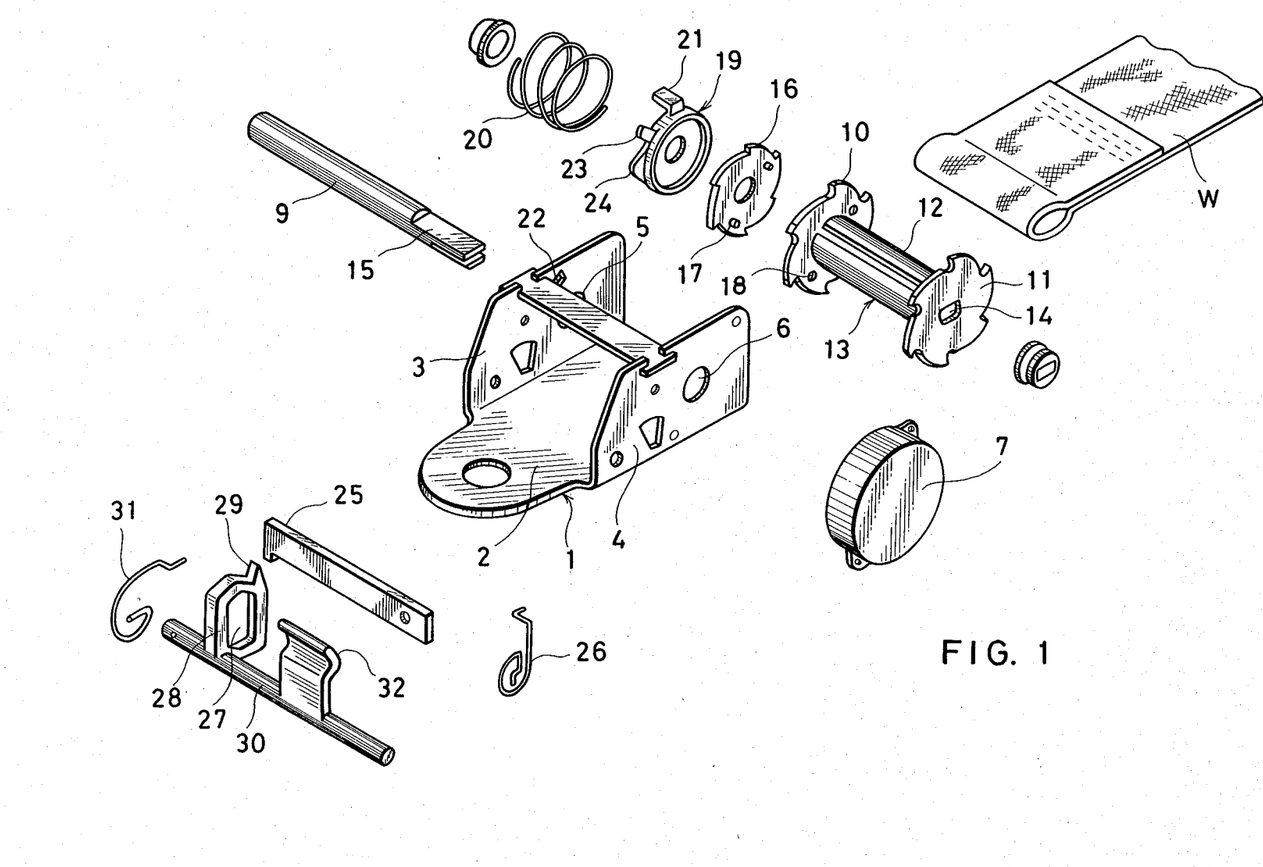
FIG. 1 is an exploded perspective view of an automatic locking retractor according to one embodiment of this invention.
Figure 2:
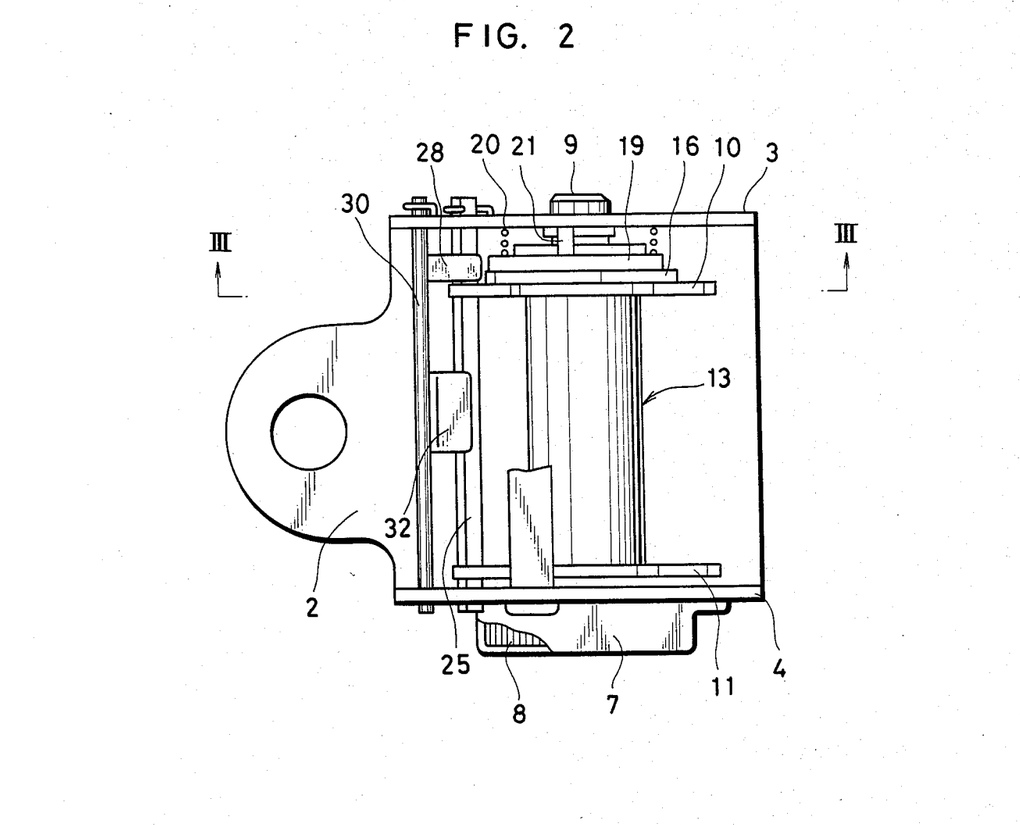
FIG. 2 is a plan view of the automatic locking retractor of FIG. 1.
Figure 3:
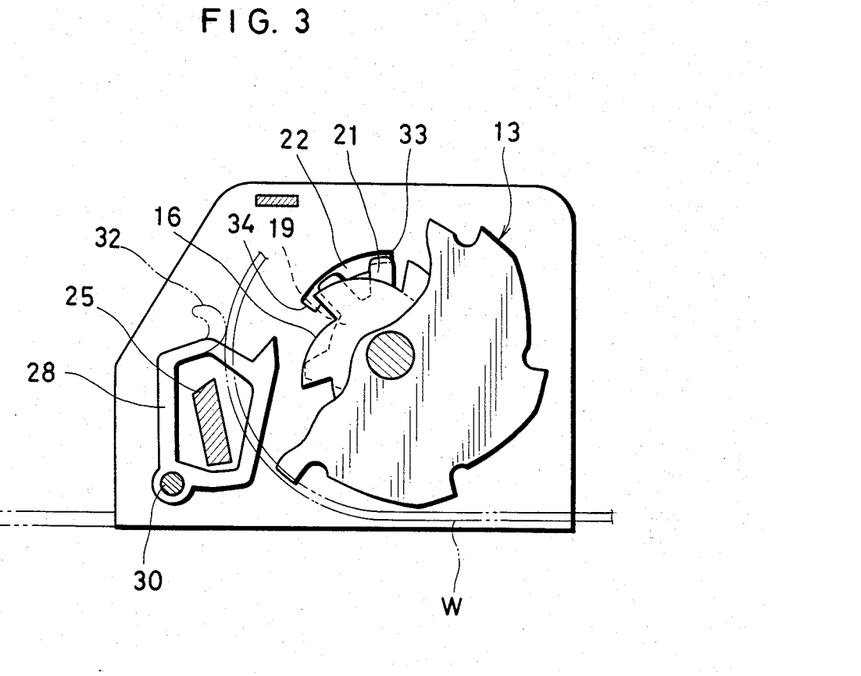
FIG. 3 is a cross-sectional view of the automatic locking retractor, taken along line III—III of FIG. 2.

Referring first to FIGS. 1 to 3, a casing 1 has a base 2 and a pair of side plates 3,4 extending substantially upright from the base 2. Spindle holes 5,6 are bored through the side plates 3,4 at substantially central parts thereof. In the spindle holes 5,6, is rotatably supported a take-up spindle 9 which is applied with a rotary force normally urged in the webbing-winding direction (namely, in the clockwise direction on FIG. 1) by means of a take-up spring 8 housed in a spring cover 7. On the take-up spindle 9, there are mounted a pair of cog wheels 10,11 each having teeth formed with a constant interval on the outer circumference thereof and a reel 13 having a cylindrical portion 12 which connects the cog wheels 10,11 to each other. The reel 13 is rotated integrally with the take-up spindle 9 because a fitting hole 14 of the cog wheel 11 is press-fit over a bevelled end portion 15 of the take-up spindle 9. One end of the webbing W is fastened between the take-up spindle 9 and the reel 13 by a method known per se in the art.

Outside the other cog wheel, i.e., the cog wheel 10, there is provided a ratchet wheel 16 which defines on the outer circumference thereof the same number of teeth as the cog wheels and is preferably made of a resin. The ratchet wheel 16 may be rotated integrally with the cog wheels when pins 17,17 have been respectively pushed in bores 18,18 formed through the cog wheel 10.

Between the ratchet wheel 16 and the side plate 3, there are also provided a disk 19 rotatably mounted on the take-up spindle 9 and a coil spring 20 urging the disk 19 toward the ratchet wheel 16. Accordingly, the disk 19 is kept in frictional contact with the ratchet wheel 16 so that the disk 19 is cooperated with rotation of the take-up spindle 9 as the ratchet wheel 16 is capable of rotating integrally with the take-up spindle 9 as described above. On the disk 19, there is formed a lug 21 extending along the axis of the take-up spindle 9. Since the lug 21 is loose-fit in a slot 22 formed through the side plate 3, the turnable angle of the disk 19 is limited. The disk 19 also defines on the outer circumference thereof a first projection 23 and a second projection 24 having a radial height somewhat less than the first projection 23. Functions of the first and second projections 23,24 will be described later in this specification.

A lock lever 25 extends between the side plates 3 and 4 of the casing 1 and in front of the reel 13 in such a way that the lock lever 25 is displaceable between a first position, where it is kept in engagement with the cog wheels 10,11 to restrain the cog wheels 10,11 from rotation, and a second position where the lock lever 25 permits free rotation of the cog wheels 10,11. The lock lever 25 is normally urged in the counterclockwise direction, in other words, toward the second position where it is out of engagement with the cog wheels 10,11, owing to the biasing force of a lever spring 26.

A pawl 28, which is preferably made of a resin, is provided in such a way that the lock lever 25 is received in a hollow part 27 of the pawl 28. The pawl 28 defines an edge 29, which is engageable with the ratchet wheel 16. The pawl 28 is normally urged in a direction in which the pawl 28 is engageable with the ratchet wheel 16, because a support shaft 30 constructed as a unitary member with the pawl 28 is urged in the clockwise direction by means of a spring 31. On the support shaft 30, a sensing piece 32 is also provided as a unitary member so as to sense the wound-up length of the webbing W.

Next, operation of the automatic locking retractor according to the above embodiment will be described with reference to FIGS. 3 through 6.

In FIG. 3, the webbing W is in a wound-up state. Here, the sensing piece 32 has been pushed outwards by the thus-wound webbing W and the pawl 28, which is integral with the sensing piece 32, is thus held in the non-engagement position where the pawl 28 is not engageable with the ratchet wheel 16. On the other hand, the lock lever 25 is urged in the counterclockwise direction by the lever spring 26 and is held in the second position where it permits free rotation of the cog wheels 10,11. Furthermore, the disk 19 is held in a position turned to the maximum extent in the webbing-winding direction, i.e., in the clockwise direction with the lug 21 kept in contact with one end 33 of the slot 22.

Figure 4:
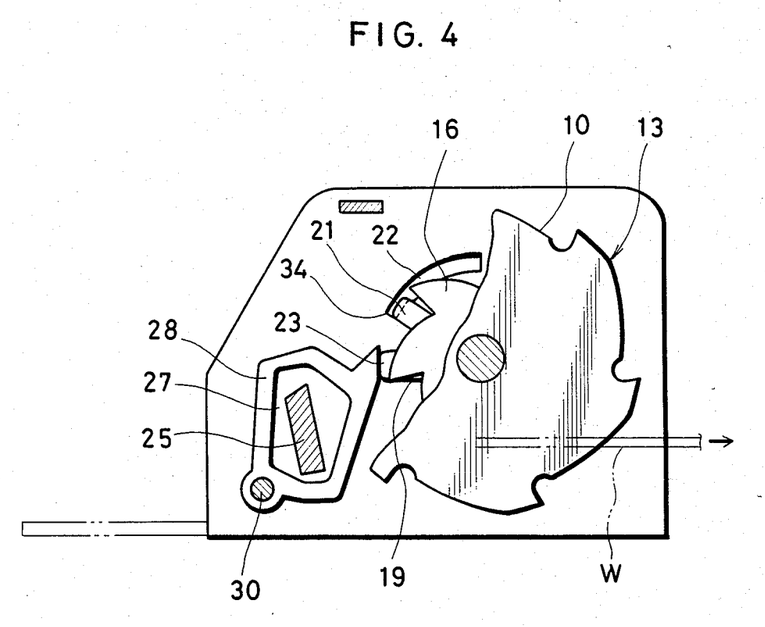
FIGS. 4 through 6 are partially cut-away, simplified, cross-sectional views of the automatic locking retractor of FIG. 1, illustrating the operation of the retractor in three different stages respectively.

When the occupant in the vehicle seat pulls out the webbing W to wear it, the reel 13 which is integral with the take-up spindle 9 and the ratchet wheel 16 which is in turn integral with the reel 13 are rotated in the counterclockwise direction against the biasing force of the take-up spring 8. At the same time, the disk 19 which is in frictional engagement with the ratchet wheel 16 is turned to a position where the lug 21 of the disk 19 is brought into contact with the other end 34 of the slot 22. The disk 19 is then held in the above position as it is kept in slip-contact with the ratchet wheel 16. This state is shown in FIG. 4. At this time, the thickness of the webbing on the reel 13 becomes thinner as the webbing is pulled out. Reflecting the decreasing thickness of the webbing, the sensing piece 32 which is kept in contact with the webbing is turned clockwise by virtue of the biasing force of the spring 31. Accordingly, the pawl 28 is also turned clockwise because it is integral with the sensing piece 32. However, the disk 19 has been displaced to the maximum extent in the counterclockwise direction as mentioned above before the pawl 28 starts to turn in the above manner. Therefore, the pawl 28 is brought into contact with the first projection of the disk 19 and is restrained from undergoing any further turning motion. Consequently, the pawl 28 is continuously held in a position where it is out of engagement with the ratchet wheel 16. On the other hand, the lock lever 25 is continuously kept in the same position as that illustrated in FIG. 3. Therefore, it is still possible to pull out the webbing and the disk 19, pawl 28 and lock lever 25 are all held in their respective positions illustrated in FIG. 4 until the pulling-out of the webbing is completed.

Figure 5:
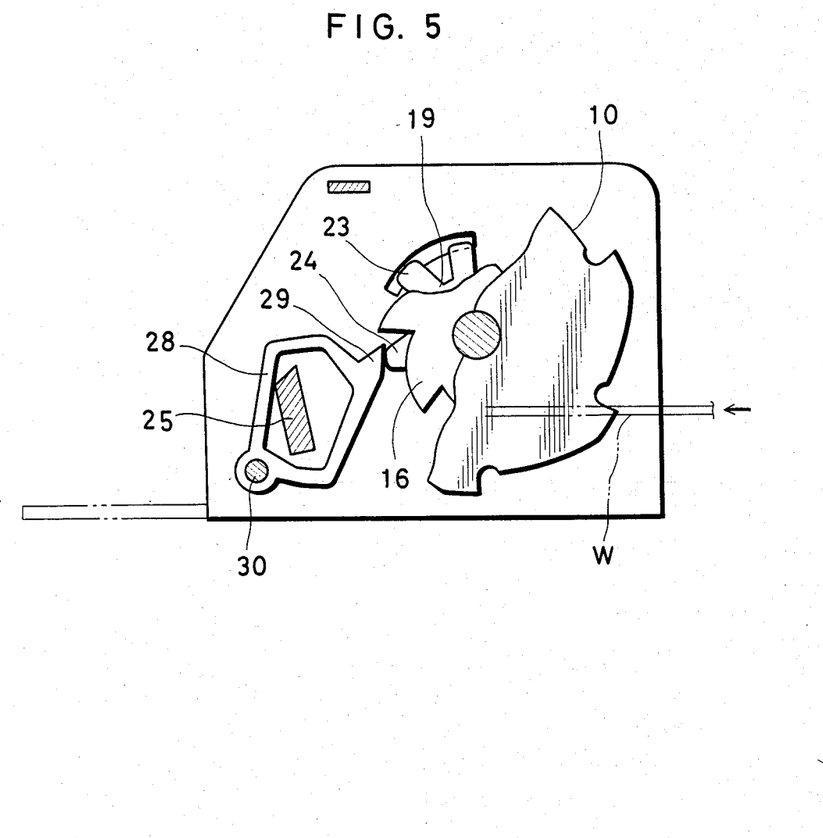

As soon as the occupant has worn the webbing following the completion of the pulling-out of the webbing, the webbing is slightly rewound over any extra length. This causes the ratchet wheel 16 to rotate in the clockwise direction, thereby rotating the disk 19 clockwise since the disk 19 is in frictional engagement with the ratchet wheel 16. This state is illustrated in FIG. 5. At this stage, the pawl 28 is brought into contact with the second projection 24 of the disk 19. Since the second projection 24 has a radial height somewhat lower than the above-described first projection 23, the pawl 28 is allowed to turn clockwise slightly from the position shown in FIG. 4 owing to the biasing force of the spring and assumes the intermediate position. In the intermediate position, the edge 29 of the pawl 28 is engageable with the ratchet wheel 16.

On the other hand, the lock lever 25 is still kept in the second position and permits free rotation of the cog wheels 10,11 as in FIG. 3.

Figure 6:
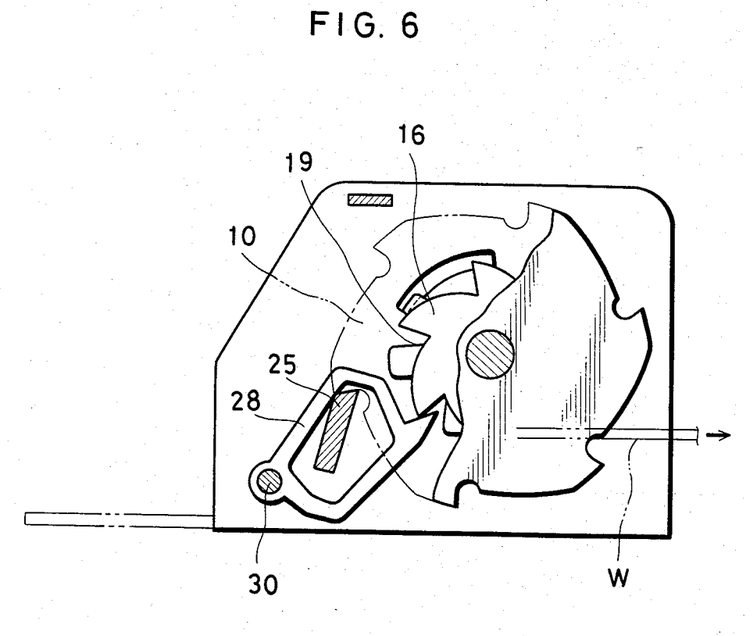

If the webbing is again applied with a pulling force in the state shown in FIG. 5, for example, in the event of an emergency such as vehicle collision or the like, the disk 19 is turned counterclockwise together with the ratchet wheel 16 and is brought into a state as shown in FIG. 6. Here, the pawl 28 which has been held in the above-mentioned intermediate position is brought into engagement with the ratchet wheel 16 and is turned to the engagement position. Owing to this turning movement of the pawl 28, the lock lever 25 is caused to swing to the first position where it is brought into engagement with the cog wheels 10,11. Accordingly, the cog wheels 10,11, in other words, the take-up spindle 9 is restrained from any further rotation and the pulling-out of the webbing W is restrained, thereby protecting the occupant safely.

Since the pawl 28 and lock lever 25 are synchronized so as to have the lock lever 25 assume the first position when the pawl 28 has reached the engagement position, there is no danger to encounter such a state that the lock lever 25 hits the tips of teeth of the cog wheels 10,11 and is knocked off and thus unable to engage with the cog wheels 10,11.

In the state shown in FIG. 5, the pawl 28 is held in the intermediate position where it is engageable with the ratchet wheel 16. Therefore, the pawl 28 is brought into the state shown in FIG. 6 without any failure when the webbing W is pulled out subsequently, thereby restraining any further release of the webbing.

When the occupant takes off the webbing W, the webbing W is rewound by the biasing force of the take-up spring 8. The retractor is thus brought into the state shown in FIG. 5 and then into the state illustrated in FIG. 3. Upon rewinding the webbing, i.e., in the state shown in FIG. 5, the lock lever 25 and cog wheels 10,11 are not kept in engagement at all as mentioned above. Therefore, there is no danger that the metal parts are brought into contact and an unpleasant noise is thus produced.

Figure 7:
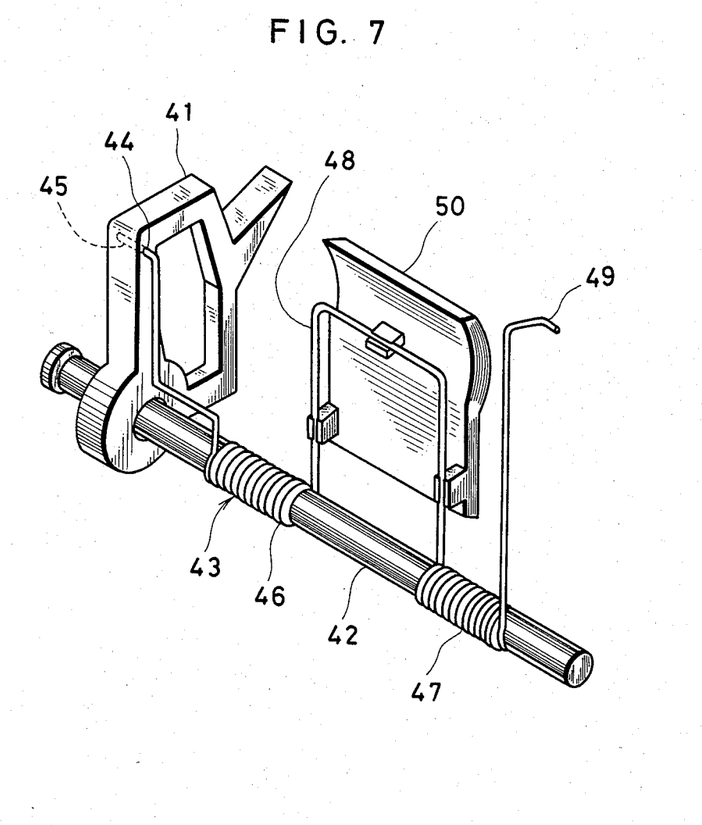
FIG. 7 is a perspective view of a pawl and sensor means according to the second embodiment of this invention.

With reference to FIG. 7, the second embodiment of this invention in which the pawl and sensing means are elastically coupled will hereinafter be described. In this embodiment, pawl 41 is rotatably supported on a support shaft 42 on which a wire spring 43 is mounted. The wire spring 43 includes a bent portion 45 which is fit in a bore 44 formed in the pawl 41, helically-wound portions 46,47, a portion 48 on which a sensing piece 50 is attached to sense the radial thickness of the wound webbing, and an attachment portion 49 where the wire spring 43 is secured to the side plate 4. Since the attachment portion 49 is twisted clockwise and secured, the sensing piece 50 and pawl 41 are both applied with a clockwise biasing force.

Since the pawl 41 and sensing piece 50 are coupled via the wire spring 43 as described above, the pawl 41 and sensing piece 50 are normally cooperated while still allowing them to move independently from each other. In the above-described first embodiment of this invention for example, the pawl 28 may only be turned when the retractor is operated from the state of FIG. 5 to that of FIG. 6, even if the sensing piece 32 is held in contact with the webbing and cannot move any further when the webbing has been wound up to a considerable radial thickness on the take-up spindle. When the above situation arises in an automatic locking retractor according to the second embodiment of this invention, there is brought about another merit that the flexible nature of the wire spring absorbs any positional difference between the pawl 41 and the sensing piece 50 relative to the take-up spindle 9 so as to protect the pawl 41 and support shaft 42 from undue forces.

It should be borne in mind that the above embodiments have been given by way of example only. Needless to say, a variety of designing modifications and changes may be made thereto so long as such modifications and changes do not depart from the principal features of this invention. For example, it may for example be contemplated to employ only one cog wheel instead of the two cog wheels 10,11, to provide the cog wheels, ratchet wheel, disk, biasing means and pawl outside the side plates of the casing, or to form projections on the side plate 3 so as to limit the turnable angle range of the disk. In the above embodiments, the lock lever 25 and pawl 28 or 41 are movable relative to each other. However, it is not essential to construct the lock lever and pawl in the above manner. It may be possible to achieve the same effect as the illustrated embodiments even if the lock lever and pawl are formed integrally, provided that the pawl is urged toward the engagement position (in other words, the lock lever which is integral with the pawl is urged toward the first position). In each of the above embodiments, the disk is kept in frictional contact with the ratchet wheel so that the disk may be turned in association with rotation of the take-up spindle. The disk may alternatively be kept in frictional contact with either one of members rotatable integrally with the take-up spindle, e.g., the cog wheel or with the take-up spindle per se.

Having now fully described the invention, it will be apparent to one of ordinary skill in the art that many changes and modifications can be made thereto without departing from the spirit or scope of the invention as set forth herein.

What is claimed is:

1. An automatic locking retractor comprising a casing, a take-up spindle rotatably supported on the casing and urged in the winding direction of an webbing, a cog wheel mounted integrally on the take-up spindle, a ratchet wheel rotatable together with the cog wheel, a disk rotatable in association with rotation of the take-up spindle by virtue of a friction force, turnable over a predetermined angle and defining a first and second projections on the outer circumference thereof, a lock lever displaceable between a first position where the lock lever is in engagement with the cog wheel and a second position where the lock lever permits free rotation of the cog wheel, a pawl displaceable between an engagement position where the pawl is in engagement with the ratchet wheel, an intermediate position where the pawl is engageable with the ratchet wheel and a non-engagement position where the pawl is kept out of engagement with the ratchet wheel, and sensor means coupled with the pawl and adapted to hold the pawl in the non-engagement position when the webbing has been wound up over a predetermined length or longer, in which the pawl assumes the non-engagement position and is kept in contact with the first projection of the disk when the webbing, which has been wound up on the take-up spindle, is pulled out, assumes the intermediate position and is kept in contact with the second projection of the disk when the webbing has then been rewound over a predetermined small length, and is then guided to the engagement position when the webbing is again pulled out; and means for displacing the lock lever from the second position to the first position as the pawl is displaced from the intermediate position to the engagement position.

2. The automatic locking retractor as claimed in claim 1, including means mounting the lock lever and pawl for movement relative to each other.

3. The automatic locking retractor as claimed in claim 2, including means for urging the lock lever toward the second position and means for urging the pawl toward the engagement position.

4. The automatic locking retractor as claimed in claim 3, wherein the means for displacing comprises means on said pawl for engaging the lock lever when the pawl has moved over a predetermined distance.

5. The automatic locking retractor as claimed in claim 1, wherein means is provided between the pawl and the sensor means so as to absorb any positional difference which may occur therebetween relative to the take-up spindle.

6. The automatic locking retractor as claimed in claim 1, wherein the disk is urged by a coil spring against the ratchet wheel so that the friction force is produced between the ratchet wheel and disk.

* * * * *